(12) United States Patent
Hamilton et al.

(10) Patent No.: US 8,613,902 B2
(45) Date of Patent: Dec. 24, 2013

(54) HYDROGEN PRODUCTION USING AMMONIA BORANE

(75) Inventors: Charles W. Hamilton, Watertown, MA (US); R. Thomas Baker, Ottawa (CA); Troy A. Semelsberger, Los Alamos, NM (US); Roshan P. Shrestha, Chicago, IL (US)

(73) Assignee: Los Alamos National Security, LLC, Los Alamos, NM (US)

( * ) Notice: Subject to any disclaimer, the term of this patent is extended or adjusted under 35 U.S.C. 154(b) by 369 days.

(21) Appl. No.: 12/416,835

(22) Filed: Apr. 1, 2009

(65) Prior Publication Data

US 2009/0274613 A1    Nov. 5, 2009

Related U.S. Application Data

(60) Provisional application No. 61/072,965, filed on Apr. 4, 2008.

(51) Int. Cl.
*C01B 3/04* (2006.01)

(52) U.S. Cl.
USPC ........................... 423/648.1; 502/162

(58) Field of Classification Search
USPC .................................................... 423/648.1
See application file for complete search history.

(56) References Cited

U.S. PATENT DOCUMENTS

| | | | |
|---|---|---|---|
| 5,756,863 | A | 5/1998 | Murayama et al. |
| 6,706,895 | B1 | 3/2004 | Park et al. |
| 7,754,641 | B2 * | 7/2010 | Soloveichik et al. ......... 502/114 |
| 2004/0249157 | A1 | 12/2004 | Guram et al. |
| 2006/0292303 | A1 | 12/2006 | Millward et al. |
| 2007/0128475 | A1 * | 6/2007 | Blacquiere et al. ............. 429/13 |
| 2010/0166644 | A1 * | 7/2010 | Schubert et al. ........... 423/648.1 |
| 2010/0329974 | A1 * | 12/2010 | Chen et al. ................. 423/648.1 |
| 2011/0070152 | A1 * | 3/2011 | Abdur-Rashid et al. ...... 423/657 |
| 2011/0104046 | A1 * | 5/2011 | Abdur-Rashid et al. ... 423/648.1 |

OTHER PUBLICATIONS

Baitalow, "Thermal Decomposition of B-N-H Compounds Investigated by Using Combined Thermoanalytical Methods," Thermochimica Acta, vol. 391 (Aug. 2002) pp. 159-168.
Bluhm, "Amineborane-Based Chemical Hydrogen Storage: Enhanced Ammonia Borane Dehydrogenation in Ionic Liquids," J. Am. Chem. Soc., vol. 128 (Jun. 2006) pp. 7748-7749.
Denney, "Efficient Catalysis of Ammonia Borane Dehydrogenation," J. Am. Chem. Soc., vol. 128 (Aug. 2006) pp. 12048-12049.
Stephens, "Acid Initiation of Ammonia-Borane Dehydrogenation for Hydrogen Storage," Angew. Chem. Int. Ed., vol. 46 (Jan. 2007) pp. 746-749.
Keaton, "Base Metal Catalyzed Dehydrogenation of Ammonia-Borane for Chemical Hydrogen Storage," J. Am. Chem. Soc., vol. 129 (Feb. 2007) pp. 1844-1845.
Blaquiere, "Ruthenium Catalyzed Dehydrogenation of Ammonia Boranes," J. Am. Chem. Soc., vol. 130 (Oct. 2008) pp. 14034-14035.
Kasse, "Ruthenium Complexes with Cooperative PNP Ligands: Bifunctional Catalysts for the Dehydrogenation of Ammonia-Borane," Angew. Chem. Int. Ed., vol. 48 (Jan. 2009) pp. 905-907.
Jaska et al., "Transition Metal-Catalyzed Formation of Boron-Nitrogen Bonds: Catalytic Dehydrocoupling of Amine-Borane Adducts to Form Aminoboranes and Borazines," J. Am. Chem. Soc., vol. 125 (Jul. 2003) pp. 9424-9434.
Yamakawa et al., "The Metal-Ligand Bifunctional Catalysis: A Theoretical Study on the Ruthenium(II)-Catalyzed Hydrogen Transfer between Alcohols and Carbonyl Compounds," J. Am. Chem. Soc., vol. 122 (Feb. 2000) pp. 1466-1478.

* cited by examiner

*Primary Examiner* — Wayne Langel
(74) *Attorney, Agent, or Firm* — Samuel L. Borkowsky

(57) ABSTRACT

Hydrogen ("$H_2$") is produced when ammonia borane reacts with a catalyst complex of the formula $L_nM$-X wherein M is a base metal such as iron, X is an anionic nitrogen- or phosphorus-based ligand or hydride, and L is a neutral ancillary ligand that is a neutral monodentate or polydentate ligand.

9 Claims, No Drawings

HYDROGEN PRODUCTION USING AMMONIA BORANE

RELATED APPLICATIONS

This application claims the benefit of U.S. Provisional Patent Application Ser. No. 61/072,965 entitled "Hydrogen Production Using Ammonia Borane," filed Apr. 4, 2008, hereby incorporated by reference.

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to hydrogen production using ammonia borane and to catalyst complexes that are useful for hydrogen production using ammonia borane.

BACKGROUND OF THE INVENTION

Chemical hydrides for hydrogen storage are being explored as alternatives to high-pressure hydrogen tanks, sorbents, adsorbed hydrogen, and metal hydride fuels. Chemical hydrides could be packaged as non-pyrophoric, non-hazardous, solid, slurried or liquid fuels for automotive applications. Hydrogen may then be generated from such chemical hydrides under controlled conditions on-board and on demand. The spent fuel may then be regenerated either on-board or off-board.

Hydrogen storage materials ideally have a high hydrogen content and low molecular weight. Ammonia-borane ("$H_3NBH_3$"), which has a hydrogen storage capacity of 19.6 wt %, is an attractive material for such applications. Because the ammonia borane molecule contains both hydridic and protic hydrogen atoms, it spontaneously loses $H_2$ at temperatures above 80° C. $H_3NBH_3$ can be dehydrogenated completely, forming ceramic BN, but temperatures in excess of 500° C. are typically needed. Thermal decomposition of ammonia-borane in solution initially affords the cyclic oligomers cyclotriborazane ("$B_3N_3H_{12}$") and borazine ("$B_3N_3H_6$"). $B_3N_3H_6$ may be prepared from ammonia borane on a large scale in high yield over 3 hours by simply heating a tetraglyme solution of ammonia borane. It also has been shown that borazine can be thermally crosslinked at temperatures as low as 70° C. with concomitant $H_2$ evolution.

It is possible to obtain a large amount of hydrogen from $H_3NBH_3$, but low energy (i.e., minimal heat input) methods to utilize this fuel are only just being developed. For example, $H_2$ has been liberated at room temperature from $H_3NBH_3$ and the related species dimethylamine-borane ($HMe_2NBH_3$) by adding precious metal catalysts. For example, select Rh(I) species dehydrocouple $HMe_2NBH_3$ to form $H_2$, along with the cyclic dimer $[Me_2NBH_2]_2$ and acyclic aminoborane polymers. Phosphine-boranes having the general formula $H_2RPBH_3$ (R=H, Ph) also can be dehydrocoupled using metal catalysts to yield acyclic polymers.

Current methods for dehydrogenating amine-boranes at low temperatures require expensive precious metal catalysts such as rhodium. Hydrogen production using amine borane without the use of precious metal catalysts at low temperatures is desirable, as are less expensive, base metal-containing catalysts useful for producing hydrogen from ammonia borane.

SUMMARY OF THE INVENTION

In accordance with the purposes of the present invention, as embodied and broadly described herein, the present invention includes a method for producing hydrogen ("$H_2$") comprising: reacting ammonia borane with a sub-stoichiometric amount of a complex of the formula $L_nFe$—X wherein n is 1 or greater, wherein X comprises an anionic ligand selected from a nitrogen-containing ligand, a phosphorus-containing ligand and hydride, and wherein L comprises a neutral ancillary ligand selected from a phosphorus-containing ligand and a nitrogen-containing ligand.

The invention is also concerned with a method for producing hydrogen ("$H_2$") that includes combining Iron bis(hexamethyldisilazane) and N,N'-bis(p-methoxyphenyl)ethylenediamine in a solvent to form a solution, thereafter adding a bis(dialkylphosphino)alkane to the solution, and thereafter adding ammonia borane to the solution. Non-limiting examples of a bis(dialkylphosphino)alkane include 1,2-bis(dicyclohexylphosphinoethane) and 1,3-bis(diphenylphosphino)propane.

The invention also is also concerned with a catalyst complex that reacts with ammonia borane to produce $H_2$. This complex is formed by reacting Iron bis(hexamethyldisilazane) first with a N,N'-bis(p-methoxyphenyl)ethylenediamine and then with a neutral ancillary ligand. Non-limiting examples of a neutral ancillary ligand include bis(dialkylphosphino)alkane include 1,2-bis(dicyclohexylphosphinoethane) and 1,3-bis(diphenylphosphino)propane.

DETAILED DESCRIPTION

The invention is concerned with dehydrogenation of ammonia-borane ("AB"). An aspect of the invention is concerned with complexes that react with ammonia borane to produce hydrogen ("$H_2$"). These complexes have base metals (Mn, Fe, Co, Ni, and Cu are examples of base metals) and anionic ligands bonded to the base metals, and also include neutral ancillary ligands. The anionic ligands include anionic nitrogen-containing ligands, anionic phosphorus-containing ligands, and hydride. The ancillary ligands include neutral nitrogen-containing ligands and neutral phosphorus-containing ligands.

Another aspect of the invention is concerned with a catalytic process for dehydrogenation of ammonia borane to produce $H_2$. A possible mechanism for this process is shown schematically in SCHEME 1 below.

SCHEME 1.

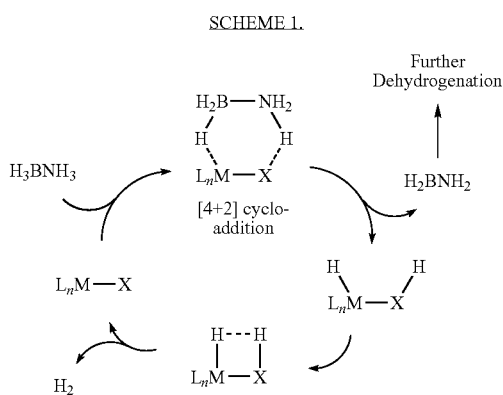

The proposed mechanism of SCHEME 1 includes a [4+2] cycloaddition across a M-X bond (i.e. a metal-X bond) of a catalyst complex of the formula $L_nM$-X, wherein M is a base metal, X is an anionic oxygen- (O—), nitrogen-, sulfur-, or phosphorus-based ligand or hydride, and L is an ancillary ligand that is a neutral monodentate (triphenylphosphine, tricyclohexylphosphine, for example) or polydentate ligand that may contain C—, N—, O—, or P— (for example, a bidentate amine ligand or bidentate phosphine ligand). This cycloaddition results in a chemical species having a base metal center, a hydride attached to the base metal center, and a protonated X (i.e. hydrogen chemically attached to X). When X is an amido ligand for example, the metal-amido is converted to a metal-amine. Thus, the chemical species abbreviated as $L_nM$-X reacts as a hydride acceptor at the base metal center (i.e. "M") and as a proton acceptor at the X ligand attached to the base metal center. Next in sequence is the release of a molecule of hydrogen ("$H_2$") and regeneration of the species depicted as $L_nM$-X. Finally, the $L_nM$-X species reacts with ammonia borane ("$H_3NBH_3$") to complete the catalytic cycle.

The EXAMPLES that follow include non-limiting embodiments for producing hydrogen using ammonia borane. EXAMPLES 1 and 2 describe how amine borane was prepared and thermally dehydrogenated. EXAMPLES 3-6 describe non-limiting embodiments of the invention wherein a catalyst complex is prepared and a sub-stoichiometric amount of the catalyst complex is combined with ammonia borane ("AB") to produce hydrogen.

Example 1

Preparation of Amine-Borane

Amine-borane was prepared as follows: Anhydrous ammonia gas was bubbled through a 1 molar solution of $BH_3$.THF in THF for 1 hour at 20° C. Alternatively, equimolar amounts of a 1 M solution of $BH_3$.THF in THF and a 0.5 molar solution of $NH_3$ in dioxane were combined at 20° C. Ammonia-borane was purified by precipitation from the reaction mixture using hexane and subsequent recrystallization from THF/$Et_2O$.

Example 2

Thermal Dehydrogenation of Amine-Borane

Thermal dehydrogenation of ammonia-borane without a catalyst was performed as follows: a solution of 14 mg ammonia-borane (0.46 mmol) in 0.5 mL of 1,2-dimethoxyethane and 1 mL of $C_6D_6$ was heated at 60° C. for 19 hour. Conversion was approximately 60% to a 3:1 mixture of $[H_2NBH_2]_n$ and $[HNBH]_3$.

Example 3

In a dry box under an inert atmosphere, Iron bis(hexamethyldisilazane) ("Fe(HMDS)$_2$") (0.012 grams, 0.027 millimoles) and N,N'-bis(p-methoxyphenyl)ethylenediamine (0.007 mg, 0.03 mmol) were added to a vial equipped with a Teflon™-coated magnetic stir-bar. Tetrahydrofuran ("THF") was dried over Na/benzophenone ketyl and degassed by subjecting to three freeze-pump-thaw cycles. About 1 mL of the dry and degassed tetrahydrofuran was vacuum transferred to the vial to produce a solution that was allowed to stir for 20 minutes. A blue solution formed, after which 1,2-bis(dicyclohexylphosphino)ethane (0.013 g, 0.028 mmol) was added and the resulting solution was stirred for 2 hours. A purple color slowly developed in the solution. Without wishing to be bound by any particular reaction mechanism, the reaction thus far can be summarized according to equation (1) below.

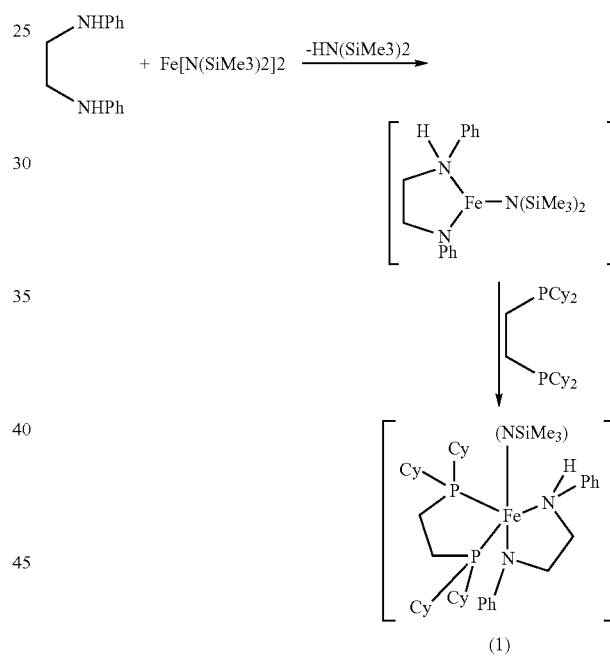

(1)

The complex that forms after the addition of the 1,2-bis(dicyclohexylphosphino)ethane is a non-limiting embodiment complex of this invention of the formula $L_n$Fe—X wherein there are two ancillary ligands "L". Ammonia-borane (0.017 grams, 0.551 mmol, 5% catalyst loading) was then added and the solution effervesced vigorously. The bubbling was greatly reduced after 5 minutes and completely stopped after 15 minutes. The reaction was judged complete by $^{11}B$ solution NMR. The major (>95%) product was identified as (—$NH_2BH_2$—)$_5$ by infrared spectroscopy. Solid-state $^{11}B$ NMR indicated that one equivalent of hydrogen ("$H_2$") was released per equivalent of ammonia borane.

Examples 4a, 4b, and 4c

EXAMPLES 4a, 4b, and 4c are similar to EXAMPLE 3. One equivalent of $H_2$ per ammonia borane was also observed from ammonia borane using the following embodiment catalyst complexes and reaction conditions:

(EXAMPLE 4a): 1 mol % Fe(HMDS)$_2$/dppp/dpen at 20° C. for 2 hours (HMDS is hexamethyldilazane; dppp is 1,3-bis(diphenylphosphino)propane; dpen is N,N'-diphenylethylenendiamine).

(EXAMPLE 4b): 5 mol % (C$_5$Me$_5$)Fe(HMDS) after 14 hours at 45° C. (Me is methyl).

(EXAMPLE 4c): 5 mol % (C$_5$Me$_5$(Fe(HMDS)(PCy$_3$) after 14 hours at 45° C. (Cy is cyclohexyl).

Example 5

In a dry-box under an inert atmosphere, bis(tricyclohexylphosphine)iron (II) chloride (0.100 grams, 0.145 mmol) and potassium hexamethyldisilazane (0.058 grams, 0.291 mmol) were added to a vial equipped with a TEFLON™-coated magnetic stirring bar. THF (4 mL) was added and the solution was allowed to stir for 2 days. The solvent was removed in vacuo leaving a tan powder that was then extracted with hexanes (20 mL). The suspension was filtered to remove the potassium chloride coproduct, and the solvent was removed in vacuo to yield a colorless powder (1, 0.070 g, 0.075 mmol, 52%). Ammonia borane (0.0142 g, 0.461 mmol) was added to a Schlenk flask equipped with a magnetic stirring bar. Bis(2-methoxyethyl) ether (0.5 mL) was added to the Schlenk flask. Solid 1 (0.0128 g, 0.0136 mmol, 3% cat loading), which is an embodiment catalyst complex, was mixed with CELITE powder, and the mixture was added to a solid addition funnel, and the solid addition funnel was attached to the Schlenk flask. The entire apparatus was purged with argon for 10 minutes and attached to a bubbler followed by a gas buret. The Schlenk flask was heated to 85° C., allowed to equilibrate for 5 minutes, and then 1 was added via the solid addition funnel. Effervescence was noticeable after 5 minutes. The reaction was judged complete after 3.8 hours, yielding hydrogen gas (22.9 mL, 1.7 equivalents per ammonia borane equivalent).

Example 6

In a reaction similar to that of EXAMPLE 5, 2 mol % of the embodiment catalyst complex Fe(HMDS)$_2$/dcpe/NH$_2$Ts gave 1.3 equiv. of H$_2$ per ammonia borane from ammonia borane in THF at 60° C. after 15 hours (dcpe is 1,2-bis(dicyclohexylphosphino)ethane; Ts is paratoluenesulfonyl).

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for producing hydrogen ("H$_2$") comprising: combining ammonia borane with a sub-stoichiometric amount of a catalyst complex of the formula L$_n$Fe—X wherein n is 1 or greater, wherein X comprises an anionic ligand selected from the group consisting of a nitrogen-containing ligand, a phosphorus-containing ligand and hydride, and wherein L comprises a neutral ancillary ligand selected from the group consisting of a phosphorus-containing ligand and a nitrogen-containing ligand, whereby hydrogen (H$_2$) is produced.

2. The method of claim 1, wherein the neutral ancillary ligand is a monodentate ligand.

3. The method of claim 1, wherein the neutral ancillary ligand is a polydentate ligand.

4. The method of claim 3, wherein the polydentate ligand is selected from the group consisting of a bidentate nitrogen-containing ligand and a bidentate phosphorus-containing ligand.

5. The method of claim 4, wherein the bidentate phosphine ligand is a bis(dialkylphosphino)alkane.

6. The method of claim 5, wherein the bis(dialkylphosphino)alkane is selected from the group consisting of 1,2-bis(dicyclohexylphosphinoethane) and 1,3-bis(diphenylphosphino)propane.

7. The method of claim 4, wherein the bidentate amine ligand is N,N'-bis(p-methoxyphenyl)ethylenediamine.

8. A method for producing hydrogen ("H$_2$"), comprising:
combining Iron bis(hexamethyldisilazane) and N,N'-bis(p-methoxyphenyl)ethylenediamine in a solvent to form a solution, and thereafter
adding a bis(dialkylphosphino)alkane to the solution, whereby a solution of catalyst complex is produced, and thereafter
adding ammonia borane to the solution of catalyst complex, whereby hydrogen is produced.

9. The method of claim 8, wherein the bis(dialkylphosphino)alkane is 1,2-bis(dicyclohexylphosphinoethane) or 1,3-bis(diphenylphosphino)propane.

* * * * *